AUTOMATIC TELECOMMUNICATION SWITCHING SYSTEMS

Filed Feb. 12, 1962 2 Sheets-Sheet 2

United States Patent Office 3,229,039
Patented Jan. 11, 1966

3,229,039
AUTOMATIC TELECOMMUNICATION SWITCHING SYSTEMS

Bloomfield James Warman, Charlton, London, England, assignor to Associated Electrical Industries Limited, London, England, a British company Filed Feb. 12, 1962, Ser. No. 172,681
Claims priority, application Great Britain, Feb. 23, 1961, 6,691/61
7 Claims. (Cl. 179—22)

This invention relates to automatic telecommunication switching systems and in particular to coordinate, or cross-point, switching systems employing relays, the invention having a particularly important application to such systems employing so-called reed relays.

As is known, a relay cross-point switching system employs "switches" each made up of a coordinate array of relay contact sets of which there is one such contact set at each cross-point between a plurality of vertical multiples and a plurality of horizontal multiples, each such multiple comprising a number of conductors according to the number of physical connections required to be established through the array in respect of a single communication path set up through it. For instance in a telephone exchange each multiple may comprise conductors corresponding to the + and − wires of a subscriber's line, together with other conductors affording control connections required for instance for line testing and holding purposes. The number of conductors in a multiple determines the number of contact pairs required in the contact set for each cross-point. The terms horizontal and vertical in context of coordinate switching are used only as a convenient mode of identfying the respective coordinate multiples: these multiples are not necessarily disposed horizontally and vertically in a practical layout.

Coordinate switching arrays as aforesaid are usually arranged in a number of switching stages each of which comprises a number of such arrays each affording access to some or all of the arrays in an adjacent stage. Adjacent stages are interconnected by multi-conductor paths, herein called links, which extend between the horizontal or vertical multiples of the switching arrays of one stage and horizontal or vertical multiples of the switching arrays of the next stage. By selective operation of the relay contact sets at particular cross-points in the several stages a communication path can be established, over the switching stages and the links between them, between multi-conductor trunks (as they will be called) which are connected to horizontal or vertical multiples of the switching arrays in the first and last, respectively, of the switching stages concerned. These trunks may extend, for instance, towards subscribers' lines on the one hand and towards other exchange equipment such as registers or supervisory circuits on the other hand. The establishment of such communication path between any two trunks is controlled by a control circuit which acts in dependence on the particular trunks concerned and on the links that are available and suitable for establishing the communication path between these trunks through the switching stages.

The present invention concerns a novel arrangement of cross-point relays which, while being similar to that described in our copending application No. 134,905, filed August 30, 1961, now Patent No. 3,129,293, as regards the manner of operation from an associated control circuit, nevertheless can afford certain advantages by reason of employing a different arrangement of the relay operating coils.

According to the present invention as basically conceived, the contact set for each cross-point in each switching stage is provided by a set of relays one of which, hereinafter called the control relay for the cross-point, has its operating coil and make contacts of its own connected in series with each other and with the operating coils of the other relays of the cross-point set in a series connection which extends between control conductors respectively included in the two multiples defining the cross-point. These make contacts of the control relay will be called the control contacts. For any communication path that is to be established through the several stages by way of respective cross-points in them, there can therefore be traced, by way of these control conductors and corresponding control conductors in the links between the stages, a control connection which includes, for the relevant cross-point of each stage, the said series connection of relay operating coils and control relay control contacts. For each cross-point the operating coil of the control relay is so positioned in the control connection as to be electrically nearer a particular end thereof than are the control relay control contacts, and a marking connection including a rectifier or other unidirectionally conductive device is taken to a point which is electrically between the control relay control contacts and operating coil and between which and the other end of said control connection is the operating coil of at least one another relay of the cross-point set. Provided that these requirements are fulfilled the order of connection of the control relay control contacts and the operating coils of the several relays of the cross-point set is otherwise irrelevant so far as the basic concept of the invention is concerned, but it will be seen later that, dependent on the order of connection, certain additional advantages may be obtained. To establish a communication path an operating potential is applied to said particular end of the control connection pertaining to that path and the marking connections for the cross-points involved in the path are marked in turn, in order from said end, with a potential of such polarity with respect to the operating potential that as regards each cross-point involved the unidirectionally conductive device in the marking connection will permit a resulting flow of operating current through the operating coil of the control relay and any other operating coil of the cross-point relay set that lies between the marking connection and the operating potential end of the control connection. Each other operating coil of the cross-point relay set, on closure of the control contacts of the control relay, becomes connected for flow of operating current therethrough between the operating potential and either the next marking connection or, in the case of the last cross-point, a holding potential applied at the other end of the control connection and having a polarity which is opposite to that of the operating potential with respect to the marking potential. After establishment of the communication path through the stages, that is, after all the relays of the cross-points involved have been operated, a holding connection for the operated relays is established through the control connection between the holding potential and a potential which, approximating to the marking potential, is applied at the operating potential end of the control connection. With this holding connection established the operating and marking potentials can be removed without release of the relays, for example on release to serve another call of the control circuit which applied these potentials. The establishment of the holding connection, which results in the flow of holding current through the serially connected operated relays in the established control connection, may be controlled at either end of the control connection: that is, either the holding potential may be permanently connected and the aforesaid potential approximating to the marking potential switched in at a suitable time after the operation of the last relay in the sequence, or this latter potential may be permanently connected and the holding potential switched in at a suitable time: in either case the switching means controlling the establishment of the holding connection may also be used for interrupting it to release the relays on clear-down of the communication path.

One advantage of the invention arises from the fact that in operating the contact set at a cross-point not all of the relays controlling the set initially receive energizing current. As a result the impedance presented to the energizing current is smaller than would be the case if all the relays for the cross-point were operated together in series, so that for a given supply voltage the energizing current is greater and the number of coil turns required to give the requisite number of operating ampere turns in the initially operated relay or relays is correspondingly less. Furthermore as each relay controls only some of the contacts of the cross-point set the required number of operating ampere turns is itself less than would be the case for a relay which had to operate all the contacts of a set. Also where the relays are so-called reed relays, the fact that there are several relays for each cross-point, instead of only one as has been more common hitherto, gives the possibility of assembling the relays together in the advantageous manner of our copending application No. 172,682, filed February 12, 1962, now abandoned.

The foregoing advantages are obtained in some measure if more than one (but not all) of the contact pairs of a cross-point set are controlled by the same relay, that is, if the number of relays for a cross-point is less than the number of contact pairs in the cross-point set. However, it is contemplated that in practice, in order to obtain full measure of the advantages indicated, each contact pair of a cross-point set would preferably be provided by an individual relay, there being then as many relays per cross-point as there are contact pairs in a cross-point set.

The invention and its advantages may be more fully understood on consideration of the accompanying drawings in which.

Figure 2:
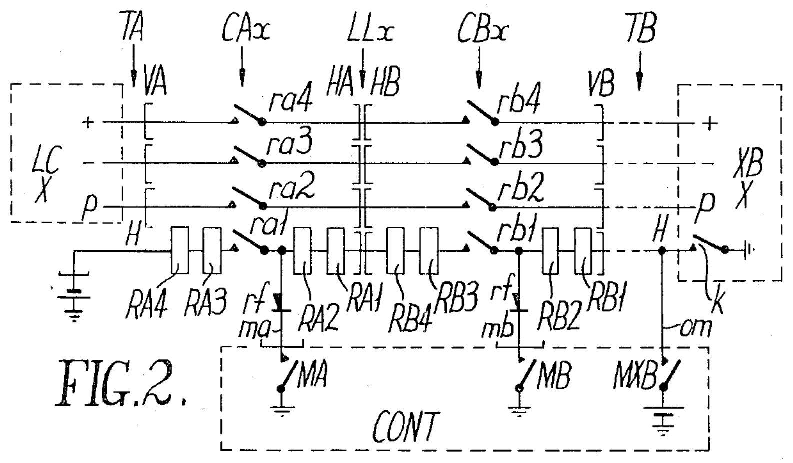
FIG. 2 illustrates, for a communication path through these two stages, an arrangement in accordance with the invention of relays providing the cross-point contact sets for the two cross-points, one in each stage, which are involved in the establishment of this communication path.
Figure 3:
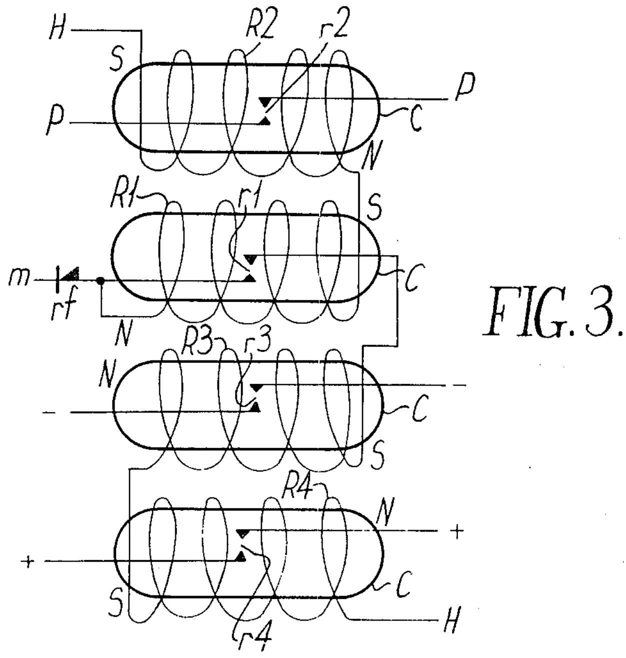
Figure 4A:
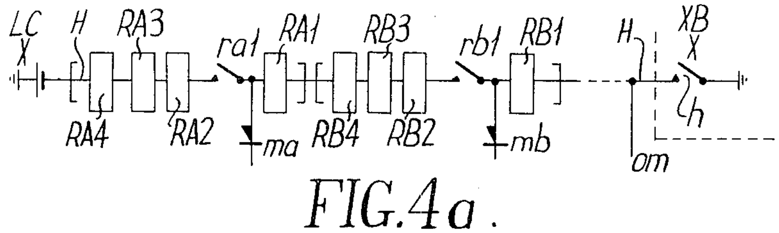
Figure 4B:
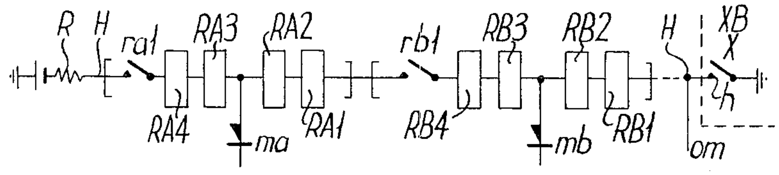

FIG. 3, which relates to a cross-point relay arrangement conforming to FIG. 2 and employing so-called reed relays, schematically illustrates for a single cross-point an assembly of such reed relays conforming to our copending application No. 172,682; and FIGS. 4*a* and 4*b* illustrate alternative arrangements of the operating coils of the relays of FIG. 2.

FIGS. 2, 4*a* and 4*b* are intended only to illustrate the principles of the invention and accordingly do not include details which are not relevant for this purpose: for instance in FIG. 2 the manner of controlling the marking contacts is not shown as this forms no part of the invention and is well within the understanding and ability of those versed in the design of relay cross-point systems, having regard to the usual marking arrangements which are included in such systems and in coordinate switching systems (including cross-bar systems) in general. In this connection reference is made for instance to the Relay Automatic System which is described in the book "Automatic Telephones" published by Pitmans in 1924 in their Technical Primer Series and which involves a marker including groups of relays which are selectively operated—one in each group—to control the establishment of a connection. In that particular system the contacts of the operated relays in the several groups function in series, but for the purposes of the present invention they could individually control the marking connections already referred to: moreover the selected relays in the several groups would be arranged to operate sequentially, this being readily achieved, for instance, by the provision of sequencing contacts operable to prevent operation of any relay in a later group until a relay of the preceding group has operated. It is emphasized that this specific marker system is quoted only by way of example to show that marker systems which can be readily adapted to meet the requirements of the present invention have been known for a very long time.

Figure 1:
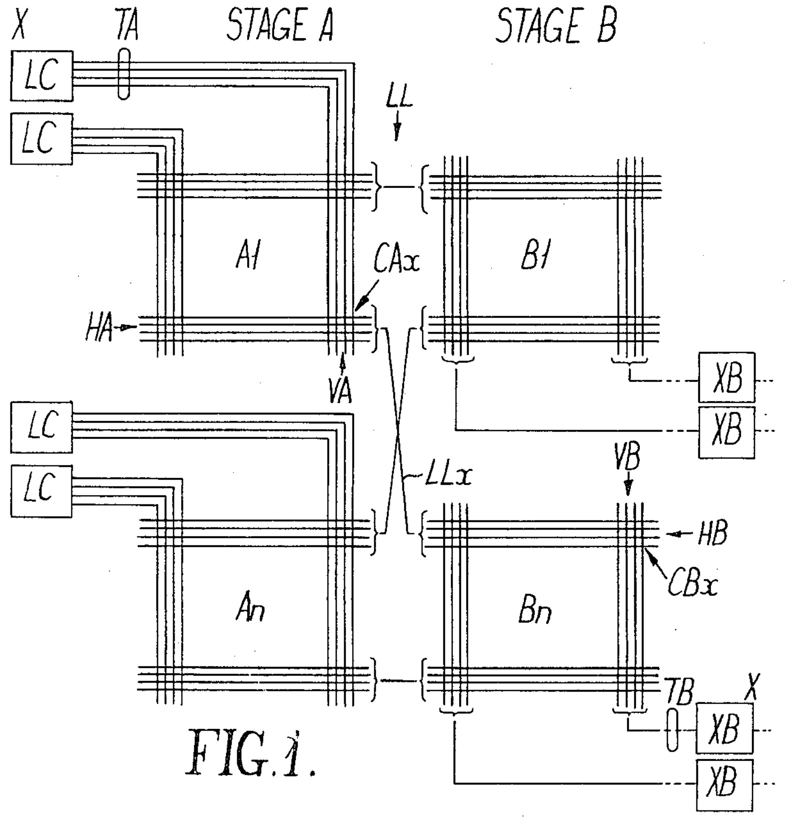
FIG. 1 illustrates in diagrammatic form two stages of coordinate relay switching.

Referring to FIG. 1 two stages A and B of relay cross-point switching are represented by the matrices A1 . . . A*n* for the first stage and B1 . . . B*n* for the second stage. Each of these matrices schematically represents a coordinate switching array of relay contact sets which afford selective access between a number of vertical multiples such as VA and VB on the one hand and a number of horizontal multiples such as HA and HB on the other hand. There is a relay contact set (not shown in FIG. 1) at each cross-point such as CA*x* and CB*x* between a horizontal multiple (HA or HB) and a vertical multiple (VA or VB). Each multiple comprises a number of conductors which is dependent on the number of physical connections required to be established in respect of a single communication path to be set up through the stages, this number being assumed to be four in FIG. 1. Each cross-point contact set comprises a corresponding number of contact pairs each affording connection, when operated, between corresponding conductors from the two multiples defining the cross-point.

Multi-conductor links LL extend between the switching arrays of the two stages on their horizontal multiples such as HA and HB, there being at least one link from each switching array in either stage to each switching array in the other stage. This cross-linking between stages is in accordance with usual practice and need not be more fully explained here. The vertical multiples such as VA of the switching arrays A1 . . . A*n* in stage A are connected to trunks such as TA extending for instance towards respective subscribers' lines, and the vertical multiples such as VB of the switching arrays B1 . . . B*n* in stage B are connected to trunks such as TB which extend towards other exchange equipment. By way of example, the trunks such as TB have been illustrated as extending, possibly through other switching stages as indicated by the dotted lines, towards respective supervisory circuits each including a transmission bridge and equipment for effecting the usual supervisory functions, such supervisory circuits being represented by the rectangles XB. The two switching stages permit the selective establishment through them, by way of the links LL, of communication paths extending between the trunks such as TA on the one hand and the trunks such as TB on the other hand, this being controlled by a control circuit not shown in FIG. 1 but represented by the dotted rectangle CONT in FIG. 2.

In describing the action of the control circuit in establishing such communication path in accordance with the invention, it will be assumed that the path is to be established between the subscriber's line circuit LC connected to trunk TA and the supervisory transmission bridge circuit XB connected to trunk TB, this line circuit and supervisory circuit being marked with X's. These two trunks TA and TB being connected to switching arrays A1 and B*n* respectively, the path to be established has to include a link such as LL*x* which affords access between these stages. Since trunk TA is connected to vertical multiple VA of array A1 and link LL*x* is connected to horizontal multiple HA in that array, and since trunk TB is connected to vertical multiple VB of array B*n* with link LL*x* connected to horizontal multiple HB thereof, the establishment of the required path involves the operation of the relay contact sets for cross-points CA*x* in array A1 and CB*x* in array B*n*.

These cross-points and the required communication path have been extracted for FIG. 2 and are shown in more detail therein, it being assumed that each cross-point is required to establish four physical connections in respect of the path, namely + and — speech connections, a test connection P and a holding connection H. Each cross-point therefore has a contact set of four contact pairs (*ra*1 . . . *ra*4 for cross-point CA*x* and *rb*1 . . . *rb*4 for cross-point CB*x*) by which these connections can be extended through the cross-point on operation of the relays controlling them.

The contact pairs in each cross-point contact set are individually provided on respective relays. Thus contact pairs *ra*1 . . . *ra*4 are provided by separate relays having operating coils RA1 . . . RA4 respectively, and contact pairs *rb*1 . . . *rb*4 are provided by separate relays having coils RB1 . . . RB4 respectively. Considering the cross-point CA*x*, for which the relay having coil RA1 constitutes the control relay previously referred to and for which the make contacts *ra*1 of this relay constitute the control contacts previously mentioned, this control relay has its operating coil RA1 and its control contacts *ra*1 connected in series with each other, and with the operating coils RA2, RA3 and RA4 of the other relays for the cross-point, in a series connection which extends between the control conductors (H) in the horizontal and vertical multiples HA and VA defining this cross-point. The relays for each other cross-point are similarly arranged: thus in cross-point CB*x* the control relay has its operating coil RB1 and control contacts *rb*1 connected in series with the operating coils RB2, RB3 and RB4 of the other relays between the control conductors (H) of multiples HB and VB. There can therefore be traced for the communication path through cross-points CA*x* and CB*x* between the line circuit LC(*x*) and supervisory circuit XB(*x*), a control connection extending from the H conductor of trunk TB over the corresponding conductor in vertical multiple VB, the series connection of relay coils RB1 . . . RB4 and contacts *rb*1 for cross-point CB*x*, horizontal multiple HB, link LL*x*, multiple HA, and the series connection of relay coils RA1 . . . RA4 and contacts *ra*1 for cross-point CA*x* to a source of negative holding potential (shown as battery) which becomes effective only after closure of contact *ra*1.

In the arrangement of FIG. 2 the control relay operating coil such as RA1 or RB1 of each cross-point is positioned electrically nearer to the end away from the holding potential end than are the control contacts such as *ra*1 or *rb*1 of this relay. Moreover a marking connection such as *ma* or *mb* is connected to a point so chosen between the operating coil and control contacts of the control relay of each cross-point that the operating coil of certain of the other cross-point relays lie between this point and the holding potential end of the control connection traced above. The foregoing observations about the electrical positional relationships of the control relays, their control contacts and the marking connections are applicable also to FIGS. 4*a* and 4*b* which, however, differ from FIG. 2 in respect of the position at which the marking connection for a cross-point is connected to the series connection of the cross-point control contacts and relay operating coils, and in respect also of the relative positions of the control contacts and relay coils in this series connection.

In FIG. 2, taking cross-point CA*x* as typical, the control contacts *ra*1 lie between the operating coils RA1 and RA2 on the one hand and RA3 and RA4 on the other hand, with the marking connection *ma* connected to a point between the contacts *ra*1 and the coils RA1 and RA2. Cross-point CB*x* is similarly arranged. The marking connection for each cross-point, such as connections *ma* and *mb* for cross-points CA*x* and CB*x*, includes an individual rectifier *rf* and is taken to the control circuit CONT. Also from the H conductor of each trunk such as TB (constituting one end of the control connection as traced above) an individual marking connection such as *om* for trunk TB is taken to the control circuit.

In the control circuit CONT are three groups of marking switches typified by contacts MA, MB and MXB respectively, plus an additional group for any additional switching stage (not shown). The switches of the group including contact MXB are selectively operated, by a marker in the control circuit, according to the particular trunk such as TB to which a communication path is to be established through the switching stages. This may be deermined, for instance, according to a particular supervisory circuit XB which has been allocated for a call over the communication path. The construction and operation of various forms of marker are well known in the telephone art and need not be described here: it may be mentioned, however, that in the case of an electronic marker the switches typified by MA, MB and MXB may be electronic rather than mechanical devices. If trunk TB is concerned (supervisory circuit XB(*x*) allocated) the marking switch MXB is operated by the marker and connects a source of positive operating potential to the marking lead *om* leading to the H conductor of the trunk TB. This operating potential appears at one end of the series connection RB1, RB2, *rb*1, RB3, RB4 extending between the multiples VB and HB defining cross-point CB*x*, and also appears at the same end of the corresponding series connections for the other cross-points that are defined between multiple VB and the other horizontal multiples of the same switching array (B*n*) in stage B.

In the group of switches typified by contact MB, each switch relates to a particular horizontal multiple in each of the several switching arrays B1 . . . B*n* of stage B and when operated extends an earth marking potential in common to these marking connections such as *mb* which go to cross-points associated with the same horizontal multiple in the several arrays. Thus switch MB relates to multiple HB in array B*n* and to the corresponding horizontal multiples in the other B arrays, and will be operated for the communication path being considered, thereby extending the earth marking potential to, inter alia, the point at which marking connection *mb* is connected to the series connection RB1, RB2, *rb*1, RB3, RB4 of cross-point CB*x*.

In the group of switches typified by contact MA each switch likewise corresponds to a particular vertical multiple such as VA in each of the several switching arrays A1 . . . A*n* in stage A. For the present example, for which the communication path to be established involves trunk TA and vertical multiple VA of array A1, switch MA will be operated by the marker, thereby applying an earth marking potential to the marking connection *ma* for cross-point CA*x* (which is associated with multiple VA) and also in common therewith to the marking connections for the cross-points associated with the corresponding vertical multiples in the other A arrays. It is not necessary to mark a horizontal multiple in stage A as the particular horizontal multiple involved (HA) is in due course marked from stage B over the H conductor of the link LL*x*.

The required communication path through stages A and B via cross-points CA*x* and CB*x* is established as follows. The switch MXB is first operated by the marker to identify the trunk TB and supervisory circuit XB(*x*) by marking the H conductor of this trunk with the operating potential. The marker then operates switch MB to apply earth marking potential to connection *mb* and the relays to which coils RB1 and RB2 belong therefore operate to the potential difference between this earth marking potential and the positive operating potential applied over switch MXB, the rectifier *rf* in connection *mb* being poled to permit flow of operating current in this condition. The operated relays close their contacts *rb*1 and *rb*2. The marker then operates switch MA and re-opens switch MB. With the contacts *rb*1 of the control relay now closed, the relays to which coils RB3, RB4, RA1 and RA2 belong now operate to the potential difference between the operating potential still applied by switch MXB and the earth marking potential applied over operated switch MA to marking connection *ma*. The previously operated relays (RB1 and RB2) remain operated to this same potential difference. The full contact set *rb*1 . . . *rb*4 for cross-point CB*x* has now been operated and also contacts *ra*1 and *ra*2 for cross-point CA*x*. The marker now re-opens switch MA, and with relay contact *ra*1 now closed the remaining relays (RA3, RA4) for cross-point CA*x* operate in series with the already operated relays to the potential difference between the negative holding potential already mentioned and the operating potential which switch MXB is still applying to the other end of the control (H) connection now established through the relay operating coils. The full contact set *ra*1 . . . *ra*4 for cross-point CA*x* has now been operated and the required communication path between the line circuit LC*x* and the supervisory circuit XB(*x*), including the +, — and P-connections has now been established in addition to the control connection (H). Subsequently, for instance after the control circuit has found the line circuit LC(*x*) to be free by testing the condition of the P-connection in any convenient manner, not shown, supervision can be transferred to the supervisory circuit XB(*x*) which, inter alia, then applies a holding earth potential at contact *k* to the adjacent end of the control connection, the operated relays now being held, dependent on contact *k* between this holding earth potential and the negative holding potential in line circuit LC(*x*). This permits the control circuit CONT to be released, the marker switch MXB being able to be reopened without disturbing the relays.

The control connection is free from interference by operation of the control circuit in establishing subsequent calls, because the rectifiers *rf* are now backed off by the negative potentials which, by voltage dividing action of the series connected coils of the operated relays, now appear at those points at which the marking connections *ma* and *mb* are connected in the control connection.

Using reed relays, the arrangement shown in FIG. 2 for the relay operating coils at a cross-point, namely two of the four operating coils on one side of the control relay contacts and the other two on the other side, with the marking connection taken to a point between the control contacts and one of these pairs of coils, enables the cross-point relays to be assembled in an advantageous manner conforming to our copending application No. 172,682. The general arrangement of such an assembly is schematically illustrated by FIG. 3.

As is known the contacts of a reed relay are constituted, carried or otherwise controlled by magnetic reeds which extend, usually from opposite ends, into a sealed container of glass or other insulating material which is surrounded by an operating coil for the relay. In FIG. 3 four such reed relays having respective operating coils R1 . . . R4 and respective reed contacts pairs *r*1 . . . *r*4 in respective sealed glass containers *c*, are schematically illustrated. To conform to the arrangement required for a cross-point according to FIG. 2, the operating coils R1 and R2 are connected in series as one pair, the coils R3 and R4 are connected in series as another pair, and the contacts *r*1 of the relay with coil R1 (which is therefore the control relay for the cross-point) is connected in series with and between the two coil pairs in an overall series connection H—H. It will be noted that for convenience of wiring the control relay coil R1 is in this arrangement electrically nearer to its contacts *r*1 than is the coil (R2) paired with it: this reversed order of connection of the coils of this pair as compared with FIG. 2 is of course immaterial to the operation. The contacts *r*2 . . . *r*4 of the other three relays would be connected in the +, — and P-connections as indicated by these symbols in FIG. 3, in which also the connection of a marking connection *m* with rectifier *rf* is indicated. In each pair of coils R1, R2 and R3, R4 the coils are so interconnected with each other that, as indicated by the symbols N and S, the magnetic flux produced by them on energization is of one polarity in one coil of the pair and of opposite polarity in the other coil of the pair. This is in conformity with our copending application No. 172,682 to which reference should be had for an explanation of the effect of this arrangement and the advantages accruing from it.

It will be seen that in the arrangement of FIG. 2 the impedance presented to the flow of energizing current between the source of positive operating potential and the marked marking connection of a cross-point is that of two of the operating coils pertaining to that cross-point plus that of all the operating coils of any other cross-point for which the control relay has already been operated in another stage for the same communication path. Thus in FIG. 2 with switch MB operated, the impedance presented to the flow of energizing current is that presented by coils RB1 and RB2, whereas with switch MA operated it is that presented by coils RA1 and RA2 plus coils RB1 . . . RB4. The alternative arrangement of FIG. 4*a* reduces this impedance in that only the control relay (RA1 or RB1) of a cross-point is initially energized and operated: therefore for a given potential difference the energizing current will be greater and the number of turns in the operating coils can be less. Moreover there is also a greater number of operating coils (three instead of two) between the control relay contacts such as *ra*1 in stage A and the source of holding potential in the line circuits, thereby affording somewhat greater resistive protection of the contacts *ra*1.

In the other alternative arrangement of FIG. 4*b*, the relay operating coils for each cross-point are all directly in series with each other without intervention of the control relay contacts. Consequently with no need to consider the wiring requirements for interposing these contacts it may be possible, in arranging the reed relays in the manner of our said copending application No. 172,682 to have their operating coils alternately oppositely poled throughout except only in pairs as in FIG. 3. With the arrangement of FIG. 4*b* however, the relay coils afford no resistive protection for the control contacts such as *ra*1 in stage A, so that a resistance R may then have to be included in series with the source of holding potential in each line circuit so as to serve this purpose in known manner.

It is thought that having regard to the description already given of the operation of the arrangement of FIG. 2, the manner of operation of the alternative arrangements of FIGS. 4*a* and 4*b* will be self evident without further description.

What I claim is:

1. A multi-stage relay cross-point switching system including, for each crosspoint in each switching stage, two multi-conductor multiples defining the cross-point and and each including a control conductor, a set of relay contacts operable to interconnect corresponding conductors of said multiples, a set of relays providing said set of contacts and including a control relay for the cross-point, said relays having respective operating coils and said control relay having make contacts which are connected in series with its own operating coil and the operating coils of the other relays of the set, multi-conductor links connected between the switching stages whereby for each communication path that can be established through the several stages by way of respective cross-points in them the system includes a control connection which is traceable over said control conductors and corresponding control conductors in the links, said control connection including the said series connection of relay operating coils and control relay make contacts for the relevant cross-point in each stage with the control relay operating coil disposed electrically nearer a particular end of the control connection than are its said make contacts, and a marking connection connected to a point which is electrically between the make contacts and the operating coil of the control relay and between which and the other end of said control connection is the operating coil of at least one other relay of the cross-point set, said marking connection including a unidirectionally conductive device.

2. A system as claimed in claim 1, including a control circuit for controlling the establishment of a communication path, said control circuit comprising, means for applying an operating potential to said particular end of the control connection traceable for said path, and means for applying to the marking connections for the cross-points involved in said control connection, in sequence from said particular end, a marking potential of predetermined polarity with respect to the operating potential such that the unidirectionally conductive device in the marking connection for each cross-point involved will permit a resulting flow of operating current through the operating coil of the control relay for that cross-point and any other relay operating coil included in the control connection between such marking connection and the operating potential end of the control connection.

3. A system as claimed in claim 2, including means operable subsequently to operation of the relays for the several cross-points in said control connection, for establishing a holding connection for the operated relays, said holding connection extending over the control connection between on the one hand a potential approximating to the marking potential and connected at the same end of the control connection as was the operating potential, and on the other hand a holding potential connected at the other end of the control connection and having a polarity which is opposite to that of the operating potential with respect to the marking potential.

4. A multi-stage relay cross-point switching system including, for each cross-point in each switching stage, two multi-conductor multiples defining the cross-point and each including a control conductor, a set of relay contact pairs operable to interconnect corresponding conductors of said multiples, a set of relays individually and respectively providing said contact pairs and including a control relay for the cross-point, said relays having respective operating coils and said control relay having a make contact pair which is connected in series with its own operating coil and the operating coils of the other relays of the set, multi-conductor links connected between the switching stages whereby for each communication path that can be established through the several stages by way of respective cross-points in them the system includes a control connection which is traceable over said control conductors and corresponding control conductors in the links, said control connection including the said series connection of relay operating coils and the control relay make contact pair for the relevant cross-point in each stage with the control relay operating coil disposed electrically nearer a particular end of the control connection than is its said make contact pair, and a marking connection connected to a point which is electrically between the make contact pair and the operating coil of the control relay and between which and the other end of said control connection is the operating coil of at least one other relay of the cross-point set, said marking connection including a unidirectionally conductive device.

5. A multi-stage relay cross-point switching system including, for each cross-point in each switching stage, two multi-conductor multiples defining the cross-point and each including a control conductor, a set of relay contacts operable to interconnect corresponding conductors of said multiples, a set of relays providing said set of contacts and including a control relay for the crosspoint, said relays having respective operating coils and said control relay having make contacts which are connected in series with and electrically between its own operating coil on the one hand and the operating coils of the other relays of the set on the other hand, multiconductor links connected betwen the switching stages whereby for each communication path that can be established through the several stages by way of respective cross-points in them the system includes a control connection which is traceable over said control conductors and corresponding control conductors in the links, said control connection including for the relevant cross-point in the said series connection of relay operating coils and control relay make contacts for the relevant cross-point in each stage with the control relay operating coil disposed electrically nearer a particular end of the control connection than are its said make contacts, and a marking connection connected to a point which is electrically between the make contacts and the operating coil of the control relay and between which and the other end of said control connection is the operating coil of at least one other relay of the cross-point set, said marking connection including a unidirectionally conductive device.

6. A multi-stage relay cross-point switching system including, for each crosspoint in each switching stage, two multi-conductor multiples defining the cross-point and each including a control conductor, a set of relay contacts operable to interconnect corresponding conductors of said multiples, a set of relays providing said set of contacts and including a control relay for the crosspoint, said relays having respective operating coils and said control relay having make contacts which are connected in series with and electrically between on the one hand the operating coils of the control relay and at least one other relay of the set and on the other hand the operating coil of at least one further relay of said set, multiconductor links connected between the switching stages whereby for each communication path that can be established through the several stages by way of respective cross-points in them the system includes a control connection which is traceable over said control conductors and corresponding control conductors in the links, said control connection including for the relevant cross-point the said series connection of relay operating coils and control relay make contacts for the relevant cross-point in each stage with the control relay operating coil disposed electrically nearer a particular end of the control connection than are the control relay contacts, and a marking connection connected to a point which is electrically between the make contacts and the operating coil of the control relay and betwen which and the other end of said control connection is the operating coil of at least one other relay of the cross-point set, said marking connection including a unidirectionally conductive device.

7. A multi-stage relay cross-point switching system including, for each crosspoint in each switching stage, two multi-conductor multiples defining the cross-point and each including a control conductor, a set of relay contacts operable to interconnect corresponding conductors of said multiples, a set of relays providing said set of contacts and including a control relay for the crosspoint, said relays having respective operating coils and said control relay having make contacts which are connected in series with its operating coil and the operating coils of the other relays of the set, multi-conductor links connected between the switching stages whereby for each communication path that can be established through the several stages by way of respective cross-points in them the system includes a control connection which is traceable over said control conductors and corresponding control conductors in the links, said control connection including for the relevant cross-point in the said series connection of relay operating coils and control relay make contacts for the relevant crosspoint in each stage with the operating coils of all the relays of the set disposed electrically nearer a particular end of the control connection than are said control relay make contacts, and a marking connection connected to a point which is electrically between the make contacts and the operating coil of the control relay and between which and the other end of said control connection is the operating coil of at least one other relay of the cross-point set, said marking connection including a unidirectionally conductive device.

References Cited by the Examiner

UNITED STATES PATENTS

| | | | |
|---|---|---|---|
| 2,734,946 | 2/1956 | Mercer | 179—22 |
| 2,885,482 | 5/1959 | Baker | 179—22 |
| 2,925,474 | 2/1960 | Zahlhaas et al. | 179—22 |
| 2,974,201 | 3/1961 | Gerke et al. | 179—22 |
| 3,001,028 | 9/1961 | Kinsey | 179—22 |

FOREIGN PATENTS

| | | |
|---|---|---|
| 807,398 | 1/1959 | Great Britain. |

ROBERT H. ROSE, *Primary Examiner.*

WALTER L. LYNDE, *Examiner.*